Oct. 25, 1955    J. WOODROW    2,721,660
DOWNSPOUT TRAP
Filed Jan. 15, 1953

Jack Woodrow
INVENTOR.

BY *Clarence A. O'Brien*
*and Harvey B. Jacobson*
Attorneys

2,721,660
DOWNSPOUT TRAP

Jack Woodrow, Indianapolis, Ind.

Application January 15, 1953, Serial No. 331,393

2 Claims. (Cl. 210—88)

The present invention relates to certain new and useful improvements in downspout traps and has more particular reference to a trap which is located at the discharge end of the downspout.

Since leaves, twigs and all sorts of debris serve to clog eaves troughs and downspouts, all sorts of strainers, shields and traps have been devised for use. By and large the majority of such traps are located in the channel of the eaves trough and associated in one manner or another with the intake of the downspout. The instant invention has to do with a trap which is situated at the opposite end of the downspout, that is, the lower discharge end.

It is an object of the instant invention to provide, broadly, any suitable trap means at the discharge end of the downspout. More specifically, however, the invention appertains to an elbow on the discharge end which has effective and reliable trap means embodied therein, means which are desirable in that it is a simple readily insertable and removable sheet material partitioning member.

More particularly, the invention has to do with an elbow characterized by vertical and horizontal branches with the vertical branch attachable to the lower end of the downspout in conjunction with a partition which is arranged lengthwise in the elbow and extends nearly from one end to the other, that is in the passageway and divides the passageway into separate inward and outward chambers, the inward chamber functioning as a trap and the partition being perforated to function as a strainer in a manner to trap the leaves and debris, but to allow the water to flow on the ground on the usual trough-like concrete or similar block.

A further object of the invention is to provide, as a new article of manufacture, an insertable and removable elbow dividing partition member which comprises an elongated drip member of flexibly resilient sheet material which has a plurality of holes or perforations to function as water passing ports, the upper end being arcuately cut and conforming with the vertical branch of the elbow, the intermediate portion being bent to conform with the curvature of the elbow and the lower end having a laterally bent semicircular apertured flange which effects a partial closure for at least the lower half portion of the discharge end of the elbow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
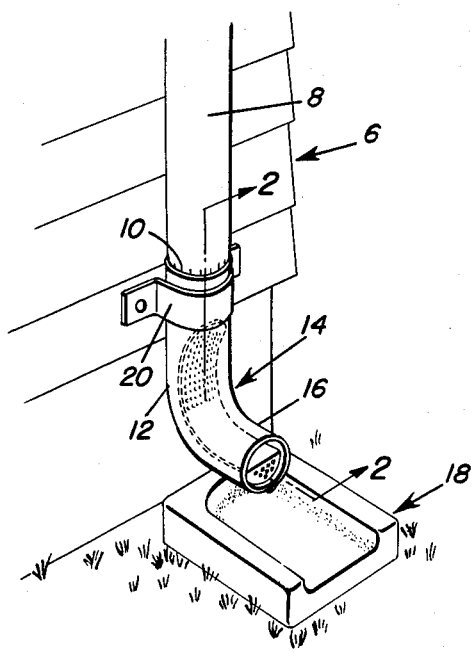
Figure 1 is fragmentary perspective view showing a portion of the downspout and the improved elbow with the trap means therein.

In Figure 1 the numeral 6 designates a building wall on which the conventional vertical downspout 8 is mounted. The lower end of the downspout is crimped or otherwise reduced as at 10 and telescoped into the upper end of the vertical branch 12 of a discharge elbow 14. The horizontal branch 16 has a discharge end emptying on the face of the usual drainage block 18. All of these features are, of course, old and well known, and as usual the elbow is held in place by a suitably attached harnessing strap 20.

The invention appertains first to the combination of the downspout 8, the attachable and detachable elbow thereon, and suitable trap means embodied in the elbow.

Figure 2:
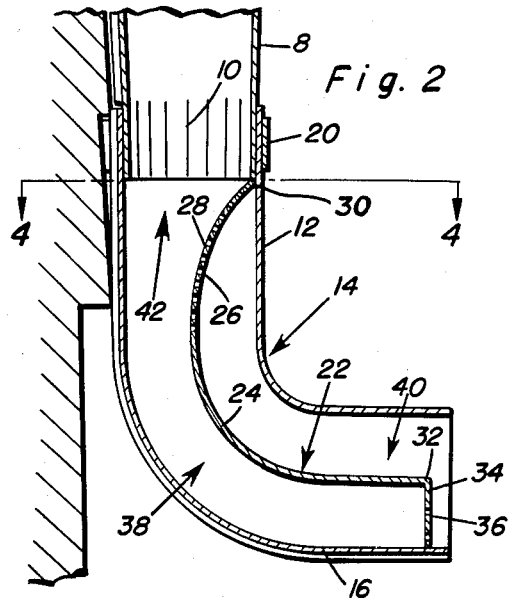
Figure 2 is an enlarged fragmentary sectional view taken on the vertical line 2—2 of Figure 1 looking in the direction of the arrows.

More particularly, novelty is predicated on the elbow as an article of manufacture and having a shield therein which will function to convert the elbow into one which has inner and outer chambers and therefore provides suitable trap means. These chambers are defined by a longitudinally disposed centrally arranged partitioning member or element which is denoted by the numeral 22. More specifically, this is a strip of flexibly resilient metal which is of a satisfactory length and which conforms to the general curvature of the elbow as shown in Figure 2. The strip member is of sheet material and the intermediate or body portion is denoted at 24 and this bends conformingly as shown in Figure 2. The upper end embodies a preformed curved portion 26 which is formed with a multiplicity of holes or apertures 28 and the tip of which is arcuately cut or shaped as at 30 so that it forms a sort of an adapter and fits into and contacts with the coacting surfaces of the vertical branch of the spout. The body portion curves as shown in Figure 2 and the lower end has a bend at 32 which carries a right-angularly disposed substantially semicircular flange 34 having a multiplicity of drainage holes 36 therein. This flange substantially fills in one-half portion of the discharge end of the elbow and therefore when the partitioning member is in place it divides the elbow into an inner trapping chamber 38 and an outer non-restricted or unobstructed flow passage or chamber 40.

The partition member also functions as a strainer as is obvious. Due to its natural inherent resilient properties and preshaped form, the strainer diverts all leaves and debris into the upper end of the chamber that is the end 42 and hence a satisfactory debris trap is had.

Figure 3:
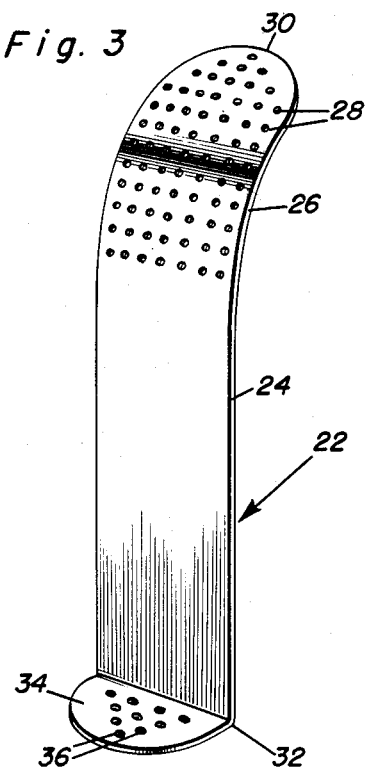
Figure 3 is a perspective view of the insertable and removable partitioning member or element.
Figure 4:
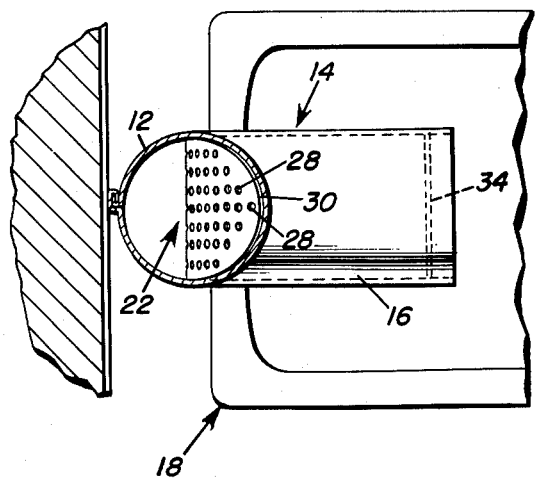
Figure 4 is a section on the horizontal line 4—4 of Figure 2 looking in the direction of the arrows.

As before mentioned the novelty is predicated on the combination of the elbow and insertable and removable partitioning strainer as shown in Figure 2, and also on the strainer per se as shown in Figure 3.

It is evident that the partitioning member can be shoved into place and that it will take the form seen in Figure 2. When it is desired to empty the leaves or debris, the partitioning member is dislodged and pulled endwise out through the discharge end of the elbow; or, if preferred, the elbow is detached and cleaned out and then returned and reattached for use.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. As a new manufacture, a detachable trap for the discharge end of a downspout, said trap comprising an open ended elbow having strainer means therein, said strainer means comprising a readily insertable and removable perforated partition which divides said elbow lengthwise into inner and outer chambers, said partition being a flexibly resilient strip member having its outer end bent laterally, perforated, and effecting a partial closure for the discharge end of said elbow, the essential body portion of said strip member being imperforate.

2. As a new article of manufacture, a readily attachable and detachable trap for the discharge end of a conventional type downspout, said trap comprising, in combination, a tubular elbow having constantly open ends and having vertical and horizontal portions, and strainer means confined in said elbow, said strainer means comprising a readily insertable and removable partition which divides said elbow lengthwise into inner and outer chambers, said partition being a flexibly resilient strip member having its outer end laterally bent, perforated, substantially semi-circular in form and cooperating with a half portion of the cooperating end of the elbow and providing a partial closure for said cooperating end, the major body portion of said partition being imperforate, the opposite end of said partition being arcuately shaped and perforated, said laterally bent end constituting a flange extending in a direction opposite to the direction of the arcuately shaped end.

References Cited in the file of this patent

UNITED STATES PATENTS

| Number | Name | Date |
|---|---|---|
| 788,102 | Hening | Apr. 25, 1905 |
| 960,649 | Levy | June 7, 1910 |
| 991,522 | McCarthy | May 9, 1911 |
| 1,136,538 | Kuenzli | Apr. 20, 1915 |
| 1,174,784 | Wasson | Mar. 7, 1916 |
| 1,552,902 | Werner | Sept. 8, 1925 |